United States Patent
Yoshiga et al.

(10) Patent No.: US 12,441,220 B2
(45) Date of Patent: Oct. 14, 2025

(54) VEHICLE SEAT

(71) Applicants: NHK SPRING CO., LTD., Yokohama (JP); SUBARU CORPORATION, Tokyo (JP)

(72) Inventors: Kensuke Yoshiga, Yokohama (JP); Hiroki Jineda, Yokohama (JP); Kenji Nagumo, Tokyo (JP); Fumito Kitanaka, Tokyo (JP); Mitsutoshi Saito, Tokyo (JP)

(73) Assignees: NHK Spring Co., Ltd., Yokohama (JP); SUBARU CORPORATION, Tokyo (JP)

( * ) Notice: Subject to any disclaimer, the term of this patent is extended or adjusted under 35 U.S.C. 154(b) by 162 days.

(21) Appl. No.: 18/508,129

(22) Filed: Nov. 13, 2023

(65) Prior Publication Data
US 2024/0157862 A1    May 16, 2024

(30) Foreign Application Priority Data
Nov. 15, 2022   (JP) .................................. 2022-182924

(51) Int. Cl.
*B60N 2/58*    (2006.01)
*B60N 2/20*    (2006.01)

(52) U.S. Cl.
CPC ................ *B60N 2/58* (2013.01); *B60N 2/20* (2013.01)

(58) Field of Classification Search
CPC .................................... B60N 2/58; B60N 2/20
See application file for complete search history.

(56) References Cited

U.S. PATENT DOCUMENTS

| 4,676,549 A | * | 6/1987 | English | B60N 2/6027 |
| | | | | 297/229 |
| 2010/0072804 A1 | * | 3/2010 | Stauske | B60N 2/58 |
| | | | | 297/452.48 |
| 2024/0383385 A1 | * | 11/2024 | Olha | B60N 2/58 |

FOREIGN PATENT DOCUMENTS

JP           5964208 B2    8/2016

* cited by examiner

*Primary Examiner* — Anthony D Barfield
(74) *Attorney, Agent, or Firm* — Knobbe, Martens, Olson & Bear, LLP

(57) ABSTRACT

A vehicle seat includes a seat cushion having an upward and downward movement mechanism configured to adjust a position of the seat cushion in a range between an upper most position and a lower most position in a seat vertical direction; and a shielding member configured to bend, and shielding a lower side of the seat cushion. The shielding member includes: an upper section disposed at a lower surface side of the seat cushion; a middle section disposed at a lower side of the upper section, provided with an inducing portion serving as a trigger for bending of the shielding member, and being configured to follow a movement, in the seat vertical direction, of the seat cushion by changing a bending angle at a bending start point portion that is bent by the inducing portion; and a lower section disposed at a lower side of the middle section.

8 Claims, 10 Drawing Sheets

FIG.2
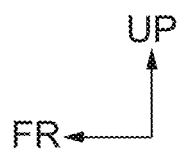
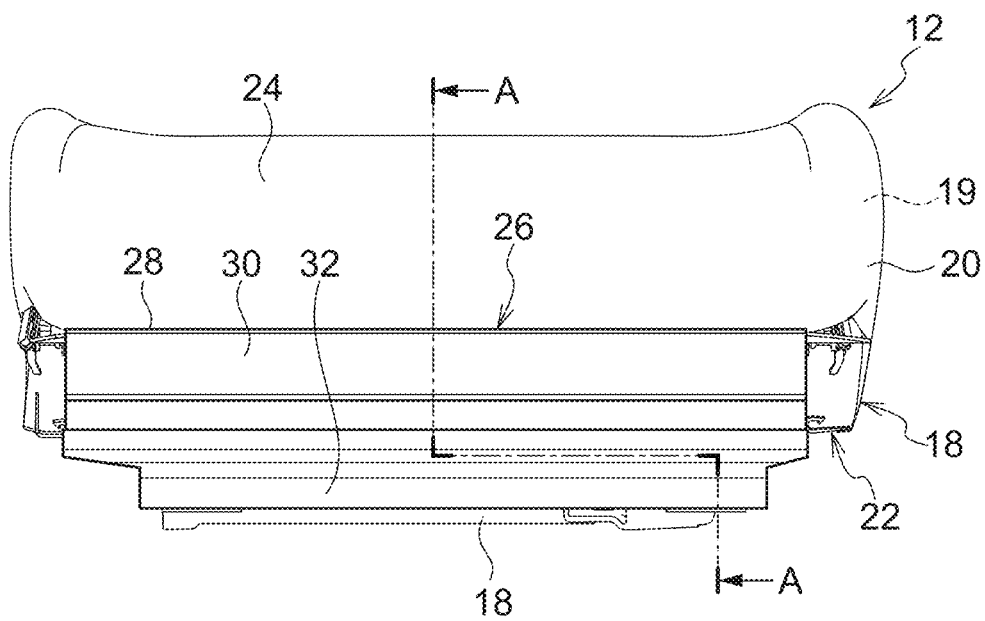

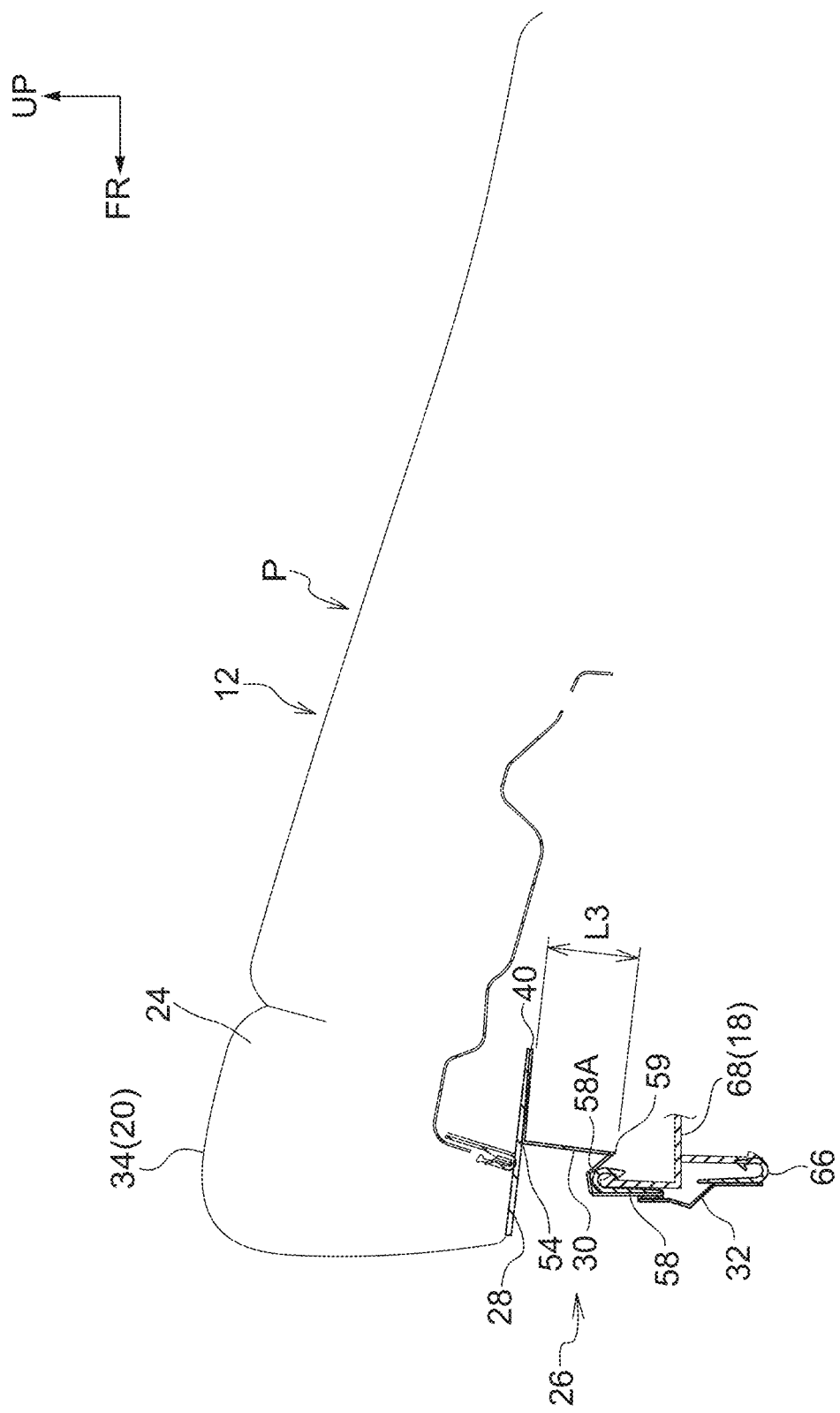

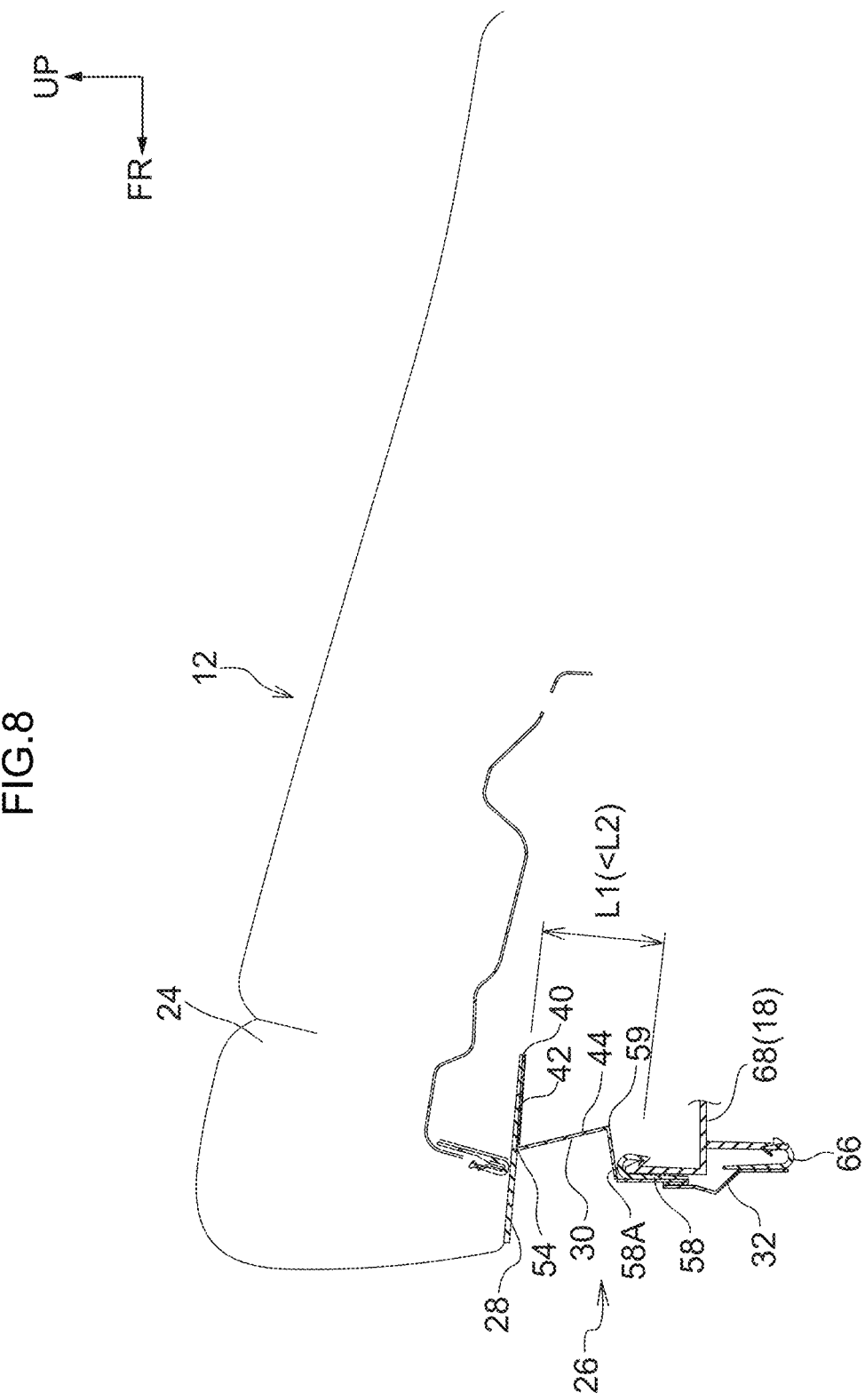

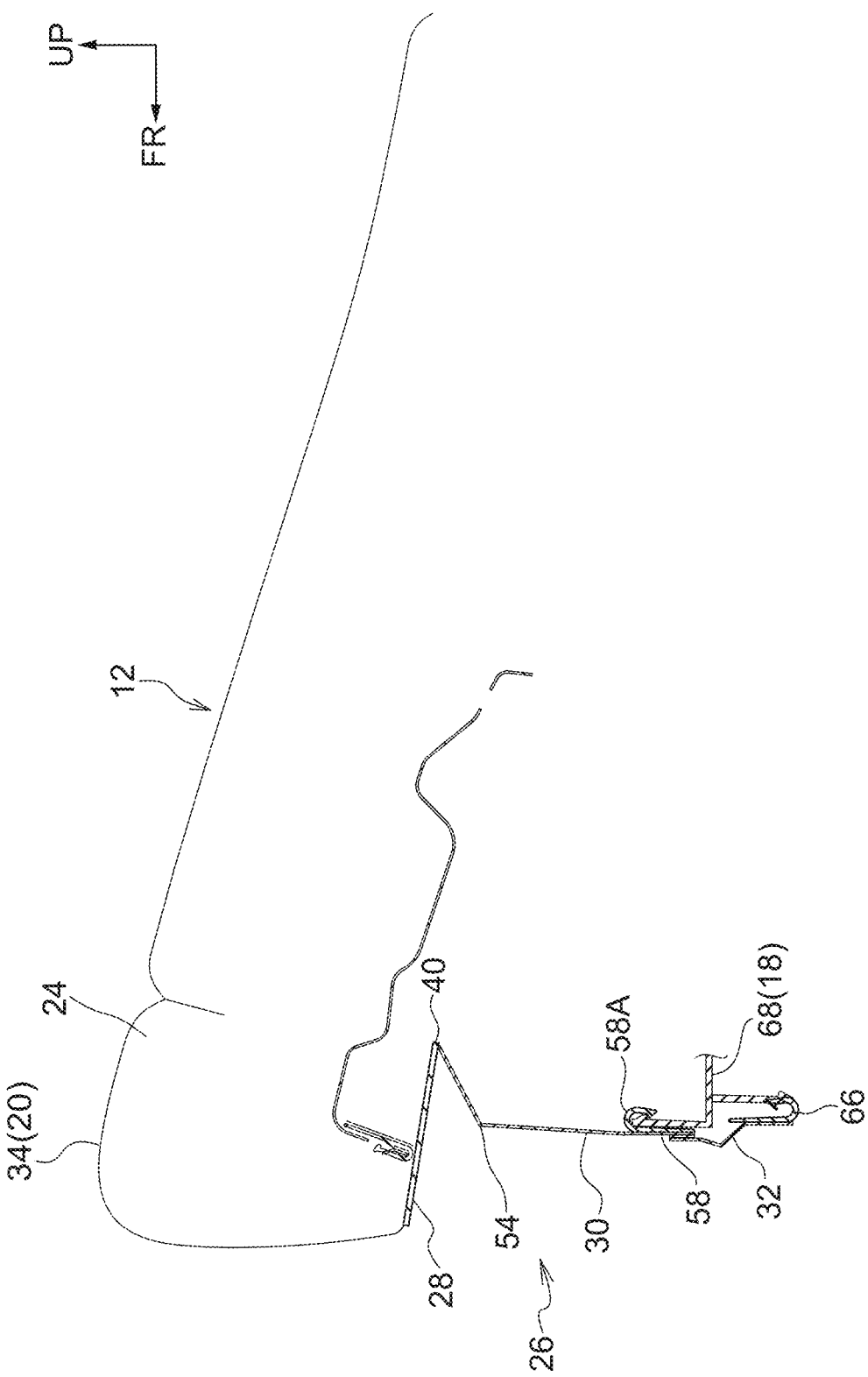

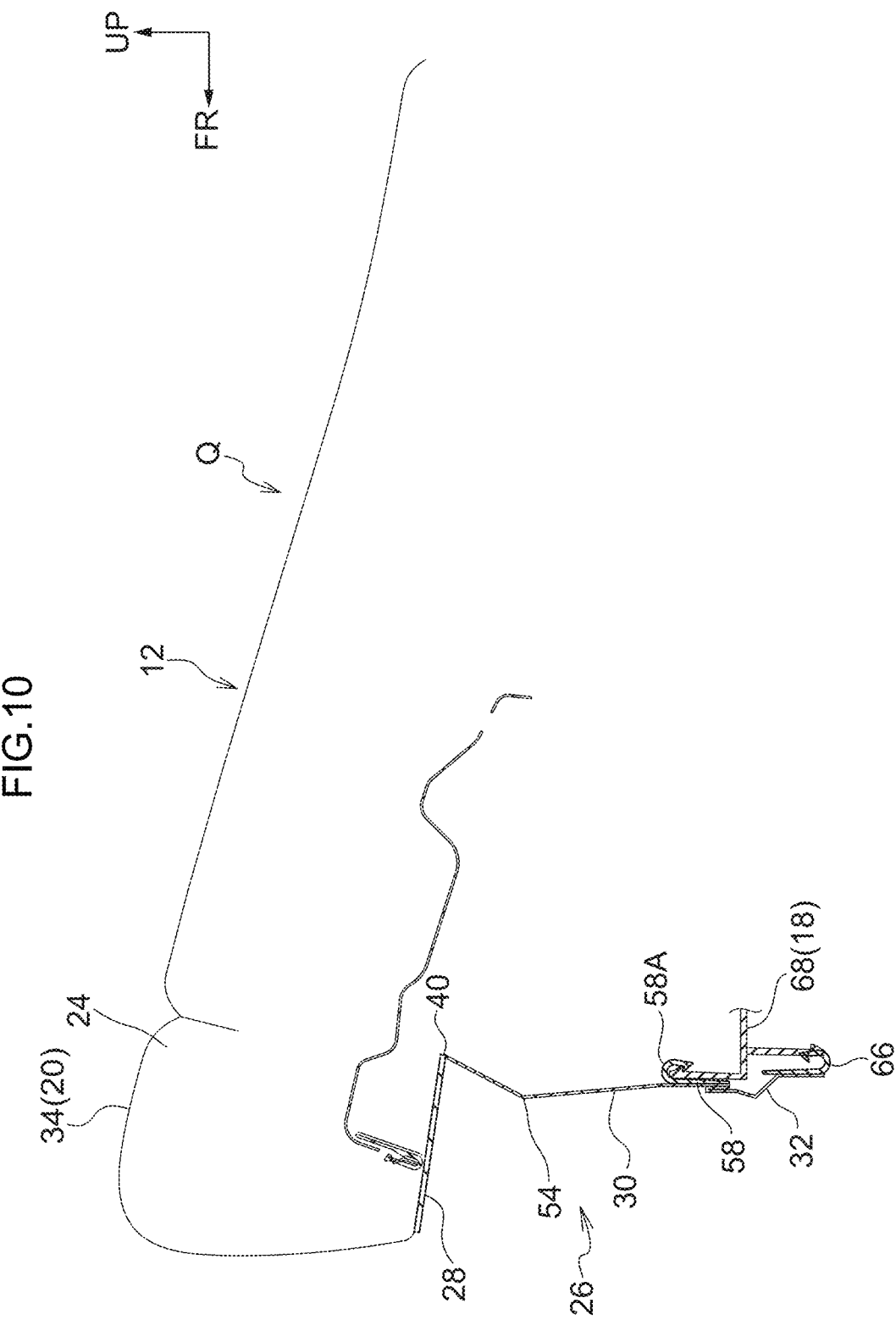

VEHICLE SEAT

CROSS-REFERENCE TO RELATED APPLICATION

This application claims priority under 35 USC 119 from Japanese Patent Application No. 2022-182924 filed Nov. 15, 2022, the disclosure of which is incorporated by reference herein in its entirety.

BACKGROUND

Technical Field

The present disclosure relates to a vehicle seat.

Related Art

Japanese Patent Publication (JP-B) No. 5964208 discloses a technique in which a shielding member is provided at a front end portion of a seat cushion in a vehicle seat. In this prior art, an upper end portion of the shielding member is fixed to a side of a frame member forming a framework of the seat cushion, and a lower end portion of the shielding member is fixed to a vehicle interior floor surface, thereby suppressing exposure of a back surface or the like of the seat cushion and intrusion of other members.

SUMMARY

In a case in which the seat cushion can be tilted up or down, a length of the shielding member is set to a dimension that shields a lower side of the seat cushion in a state where the seat cushion is tilted up (disposed at an upper side).

Therefore, in a state where the seat cushion is tilted down (disposed at the lower side), an extra length of the shielding member is slackened due to a height difference of the seat cushion, and the appearance is not good.

In view of the above circumstance, the disclosure provides a vehicle seat that ensures the appearance of a shielding member with a simple configuration without slack of the shielding member even in a state where a seat cushion is disposed at a lower side.

A vehicle seat according to a first aspect includes: a seat cushion on which an occupant can sit, the seat cushion includes an upward and downward movement mechanism configured to adjust a position of the seat cushion in a range between an uppermost position and a lowermost position in a seat vertical direction; and a shielding member provided at a front end portion of the seat cushion, the shielding member having a seat shape and being configured to bend, and shielding a lower side of the seat cushion from a vehicle interior side. The shielding member includes: an upper section that is joined to a seat skin, which covers a surface of the seat cushion and constitutes a design surface, and that is disposed at a lower surface side of the seat cushion; a middle section that is disposed at a lower side of the upper section, that is provided with an inducing portion serving as a trigger for bending of the shielding member, and that is configured to follow a movement, in the seat vertical direction, of the seat cushion by changing a bending angle at a bending starting point portion that is bent by the inducing portion; and a lower section disposed at a lower side of the middle section and disposed at the lower side of the seat cushion.

The vehicle seat according to the first aspect includes the seat cushion and the shielding member. The seat cushion is configured such that an occupant can sit on the seat cushion, and the seat cushion includes the upward and downward movement mechanism configured to adjust a position of the seat cushion in a seat vertical direction. The shielding member is provided at the front end portion of the seat cushion, has a seat shape and is configured to bend, and shields the lower side of the seat cushion from the vehicle interior side.

The shielding member includes the upper section, the middle section, and the lower section. The upper section is joined to the seat skin that covers a surface of the seat cushion and that constitutes a design surface. The upper section is disposed at a lower surface side of the seat cushion. The middle section is disposed at the lower side of the upper section, and is provided with the inducing portion serving as a trigger for bending of the shielding member. The middle section is configured to follow a movement, in the seat vertical direction, of the seat cushion by changing a bending angle at the bending starting point portion that is bent by the inducing portion.

That is, in the present aspect, in a state in which the seat cushion is disposed at the lowermost position, the bending angle of the bending starting point portion of the middle section becomes small, and the middle section is bent and folded. On the other hand, in a state in which the seat cushion is disposed at the uppermost position, the bending angle of the bending starting point portion of the middle section becomes large, and the middle section is in an extended state as compared with a state in which the seat cushion is disposed at the lowermost position.

As described above, in the present aspect, when the seat cushion is disposed relatively at a lower side, the shielding member is bent at the bending starting point portion by the inducing portion, which serves as a trigger for bending, whereby a slack of the shielding member caused by the arrangement of the seat cushion relatively at the lower side can be prevented. Accordingly, it is possible to suppress deterioration of appearance due to slack of the shielding member.

As described above, in the present aspect, by forming the inducing portion, which is a trigger for bending, at the middle section and by bending the middle section at the bending starting point portion by the inducing portion, the shielding member is bent so as to follow the movement, in the seat vertical direction, of the seat cushion. That is, in the present aspect, since no other component is used to bend the middle section, deterioration of the appearance of the shielding member can be suppressed with a simple configuration.

The "upward and downward movement mechanism" in the present aspect includes a tilt mechanism that can move the front end portion of the seat cushion along the seat vertical direction and tilt the seat cushion, an elevating mechanism that allows the seat cushion to be elevated and lowered along the seat vertical direction, and the like.

A vehicle seat according to a second aspect is the vehicle seat according to the first aspect, in which the bending start point portion is disposed at a front side, in a seat front-rear direction, with respect to an upper end portion of the middle section.

In the vehicle seat according to the second aspect, since the bending starting point portion is disposed at the front side, in the seat front-rear direction, with respect to the upper end portion of the middle section, when an external force in the seat vertical direction acts on the shielding member in the process of disposing the seat cushion at a lower side, the middle section of the shielding member can be folded with respect to the upper section at the bending starting point portion as a starting point of bending of the shielding member.

A vehicle seat according to a third aspect is the vehicle seat according to the first aspect or the second aspect, in which the bending starting point portion is disposed at a rear side, in the seat front-rear direction, with respect to a lower end portion of the middle section in a state in which the seat cushion is disposed at the lower most position.

In the vehicle seat according to the third aspect, since the bending starting point portion is disposed at the rear side, in the seat front-rear direction, with respect to the lower end portion of the middle section in a state in which the seat cushion is disposed at the lowermost position, when an external force in the seat vertical direction acts on the shielding member in the process of moving the seat cushion toward the lowermost position, the middle section of the shielding member is folded with respect to the upper section at the bending starting point portion, and an extra length of the shielding member can be guided toward a seat rear side at the lower side of the middle section.

A vehicle seat according to a fourth aspect is the vehicle seat according to any one of the first to third aspects, in which the inducing portion is a pair of cutout portions formed at both end, in a seat width direction, of the middle section, and the pair of cutout portions are respectively cut out inwardly in the seat width direction.

In the vehicle seat according to the fourth aspect, the inducing portion is the pair of cutout portions, and the pair of cutout portions are formed at both ends, in the seat width direction, of the middle section, and are respectively cut out inwardly in the seat width direction.

By forming the cutout portions along the seat width direction in this manner, a reaction force with respect to an external force acted, in the seat vertical direction, at the cut out portions becomes small in the cutout portions. Therefore, when the external force in the seat vertical direction acts on the middle section when the seat cushion moves downwardly, the middle section is bent by being triggered by the cutout portions.

A vehicle seat according to a fifth aspect is the vehicle seat according to any one of the first to fourth aspects, in which the inducing portion includes a joint portion at which opposing ends, in the seat vertical direction, of each cut out portions are joined.

In the vehicle seat according to the fifth aspect, the inducing portion is the joint portions at which the opposing ends, in the seat vertical direction, of each cutout portions are joined.

As described above, by forming the joint portions at the cutout portions, both ends, in the seat width direction, of the middle section have a shape narrower than an inner side, in the seat width direction, of the middle section. Since joint margins of the joint portions are provided on a back surface side of the middle section, both end portions, in the seat width direction, of the middle section become narrow toward a front side, in the seat front-rear direction, in advance, and the middle section has a shape bent in advance.

That is, a direction in which the middle section is bent is determined by the joint portions, and when the seat cushion moves downwardly, the joint portions serve as the inducing portion, and the middle section is bent upwardly and downwardly with a portion between the joint portions as a bending starting point portion.

A vehicle seat according to a sixth aspect is the vehicle seat according to any one of the first to fifth aspects, in which the upper section and the middle section are integrated by a first joint portion, and the first joint portion functions as the inducing portion.

In the vehicle seat according to the sixth aspect, since the upper section and the middle section are integrated by the first joint portion, and the first joint portion functions as the inducing portion, the shielding member can be bent with the first joint portion as a trigger of bending. That is, the first joint portion serves both as the inducing portion and a bending starting point portion.

A vehicle seat according to a seventh aspect is the vehicle seat according to any one of the first to sixth aspects, in which the middle section is configured by two pieces disposed in the seat vertical direction and joined to each other by a second joint portion, and the second joint portion functions as the inducing portion.

In the vehicle seat according to the seventh aspect, the middle section is configured by two pieces disposed in the seat vertical direction and joined to each other by the second joint portion. The second joint portion functions as the inducing portion, and the shielding member can be bent with the second joint portion as a trigger of bending. That is, the second joint portion serves both as the inducing portion and a bending starting point portion.

A vehicle seat according to an eighth aspect is the vehicle seat according to any one of the first to seventh aspects, in which the lower section and the middle section are integrated by a third joint portion, the vehicle seat further includes a hook member joined to the third joint portion and engaged with an engaged member provided at a seat cushion frame, which constitutes a framework of the seat cushion, at the lower side of the seat cushion, and a hook of the hook member is disposed at the middle section, and functions as the inducing portion in a case in which the seat cushion moves downwardly in the seat vertical direction.

In the vehicle seat according to the eighth aspect, the lower section and the middle section are integrated by the third joint portion. The hook member is joined to the third joint portion. The engaged member provided at a seat cushion frame constituting a framework of the seat cushion is provided at the lower side of the seat cushion, and the hook member is engaged with the engaged member.

Here, the hook constituting the hook member is disposed at the middle section. Therefore, the hook functions as the inducing portions, and in a case in which the seat cushion moves downwardly in the seat vertical direction, the middle section can be bent with the hook as a trigger of bending.

The vehicle seat according to the disclosure has an effect of ensuring the appearance of the shielding member with a simple configuration without slackening the shielding member that shields the lower side of the seat cushion even in a state in which the seat cushion is disposed at the lower side.

BRIEF DESCRIPTION OF THE DRAWINGS

Embodiments will be described in detail based on the following figures, wherein:

FIG. 2 is a front view illustrating a seat cushion of the vehicle seat according to the present embodiment;

FIG. 7 is a schematic cross-sectional view corresponding to FIG. 6 at a lowermost position of the seat cushion of the vehicle seat according to the present embodiment;

FIG. 8 is a schematic cross-sectional view corresponding to FIG. 6 in a state where the seat cushion is tilted up as compared with FIG. 7;

FIG. 9 is a schematic cross-sectional view corresponding to FIG. 6 in a state where the seat cushion is tilted up as compared with FIG. 8; and FIG. 10 is a schematic cross-sectional view corresponding to FIG. 6 at an uppermost position of the seat cushion of the vehicle seat according to the present embodiment.

DETAILED DESCRIPTION

A vehicle seat 10 according to an embodiment of the disclosure will be described below with reference to the drawings. An arrow FR, an arrow RH, and an arrow UP appropriately illustrated in each drawing indicate a front direction, a right direction, and an upward direction of the vehicle seat 10, respectively. In the present embodiment, front, rear, left, right, upward, and downward directions of the vehicle seat 10 coincide with front, rear, left, right, upward, and downward directions of the vehicle (automobile) on which the vehicle seat 10 is mounted. Hereinafter, in the case of explaining simply using the front, rear, left, right, upward, and downward directions, it indicates the front and rear in a seat front-rear direction, the left and right in a seat left-right direction (seat width direction), and the upward and downward in a seat up-down direction (seat vertical direction).

(Configuration of Vehicle Seat)

First, a configuration of the vehicle seat 10 according to the present embodiment will be described.

Figure 1:
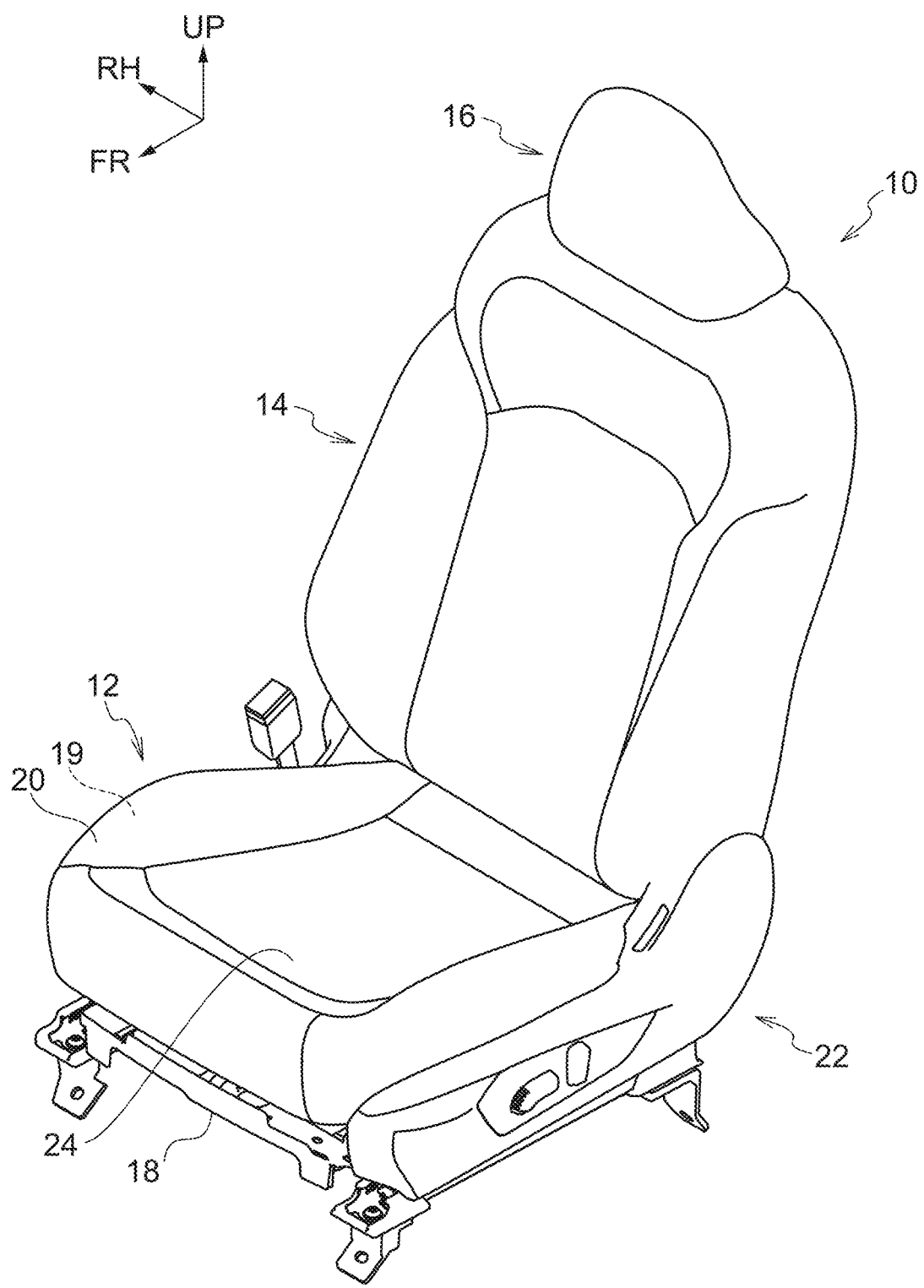
FIG. 1 is a perspective view of a vehicle seat according to the present embodiment as viewed from an obliquely left front side.

As illustrated in FIG. 1, the vehicle seat 10 includes a seat cushion 12 that supports a thigh and a waist of a seated occupant, a seat back 14 that is provided at a rear end side of the seat cushion 12 and supports an upper body of the seated occupant, and a headrest 16 that supports a head of the seated occupant.

Here, the seat cushion 12 that is a main part of the present embodiment will be described.

As illustrated in FIGS. 1 and 2, the seat cushion 12 includes a seat cushion frame 18 that is a framework member of the seat cushion 12, a seat cushion pad 19 that elastically supports a seated occupant, and a seat skin 20 that covers the seat cushion pad 19.

Figure 6:
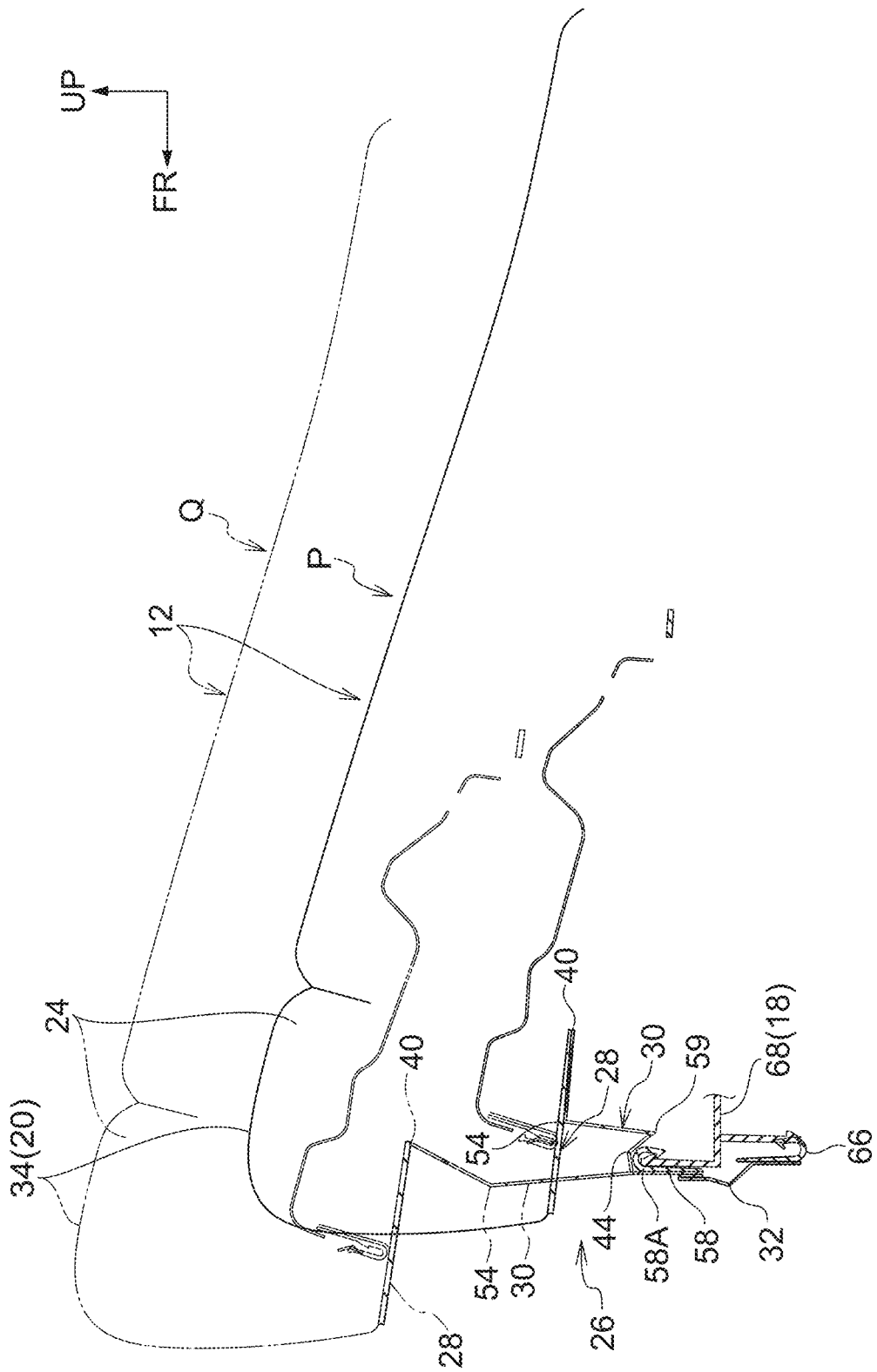
FIG. 6 is a schematic cross-sectional view taken along line A-A of FIG. 2 for explaining an action of the front skirt that bends following a tilting operation of the seat cushion of the vehicle seat according to the present embodiment.

The seat cushion 12 includes a tilt mechanism (an upward and downward movement mechanism) 22. Although not illustrated, the tilt mechanism 22 includes, for example, a four-node link mechanism including a pair of front links and a pair of rear links, and as illustrated in FIG. 6, a height of a front end portion 24 of the seat cushion 12 can be adjusted between a lowermost position P indicated by a solid line and an uppermost position Q indicated by a two-dot chain line.

In the present embodiment, the tilt mechanism 22 will be described as the upward and downward movement mechanism, but the present invention is not limited thereto. Although not illustrated, an elevating mechanism that moves the seat cushion 12 substantially horizontally, and upwardly and downwardly may be applied.

A front skirt (shielding member) 26 formed of, for example, a carpet material is provided at the front end portion 24 of the seat cushion 12. The material of the front skirt 26 is not limited to the carpet material as long as it has required rigidity, and other materials such as leather may be used.

Figure 3:
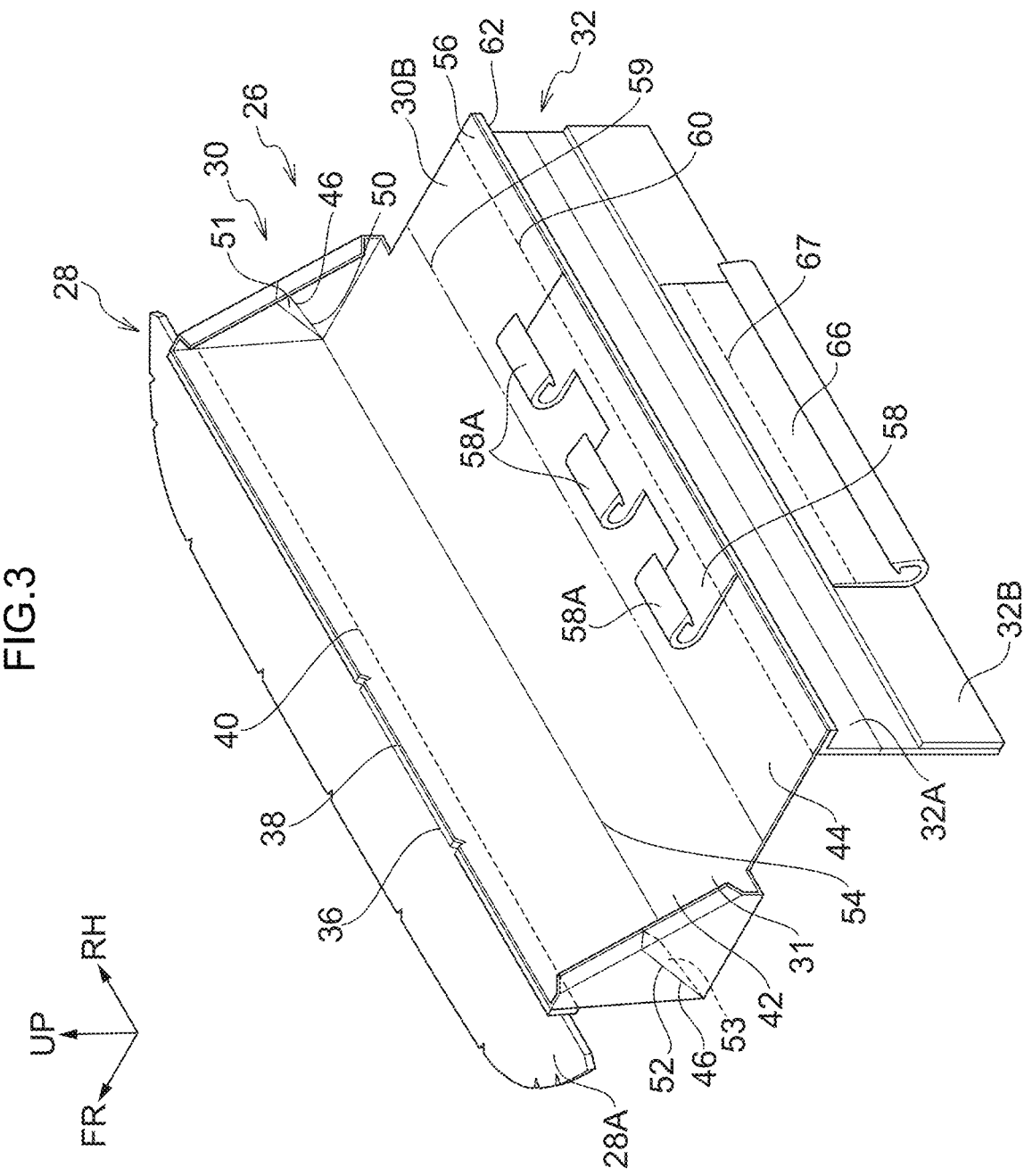
FIG. 3 is a perspective view of a front skirt provided at the seat cushion of the vehicle seat according to the present embodiment as viewed from an obliquely left rear side.
Figure 4:
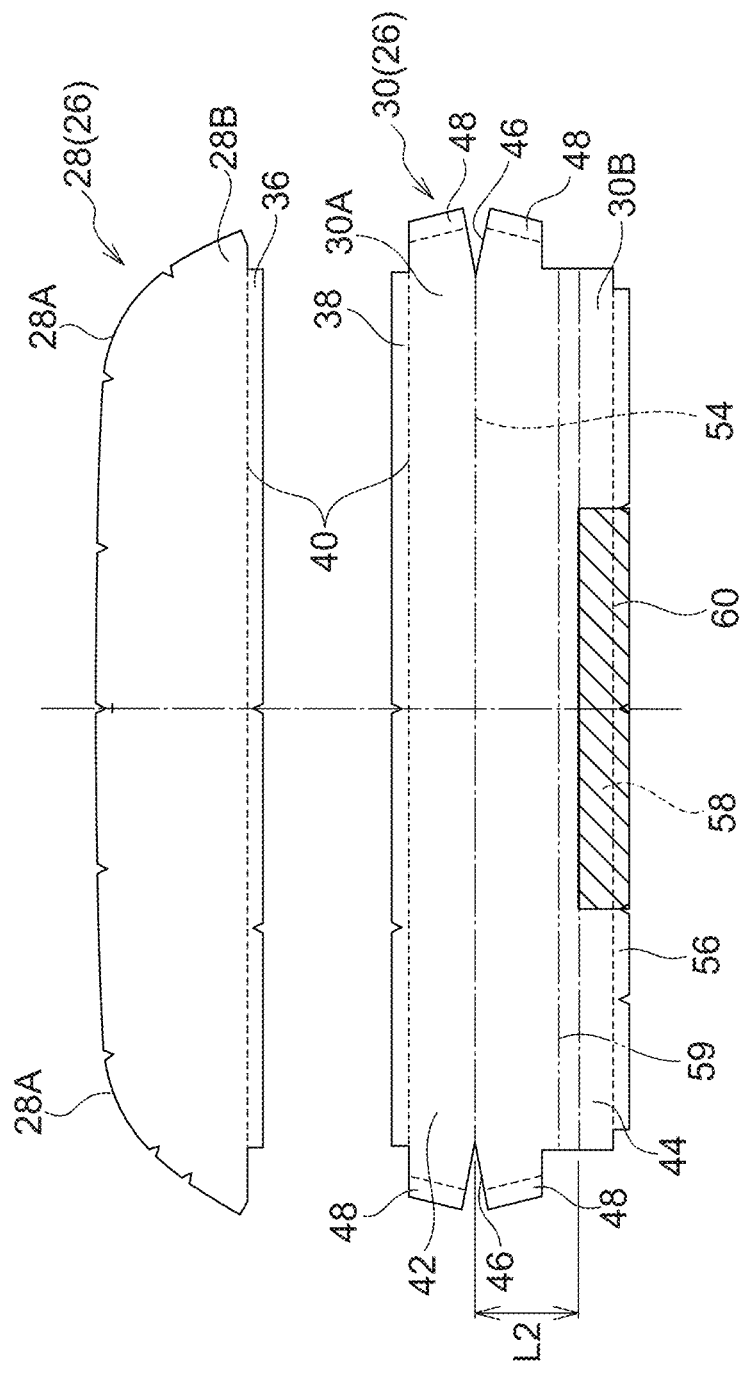
FIG. 4 is an exploded front view of a main part of the front skirt provided at the seat cushion of the vehicle seat according to the present embodiment.

In the present embodiment, as illustrated in FIG. 3, the front skirt 26 includes an upper section 28, a middle section 30, and a lower section 32. In FIG. 4, the lower section 32 is not illustrated.

Figure 5:
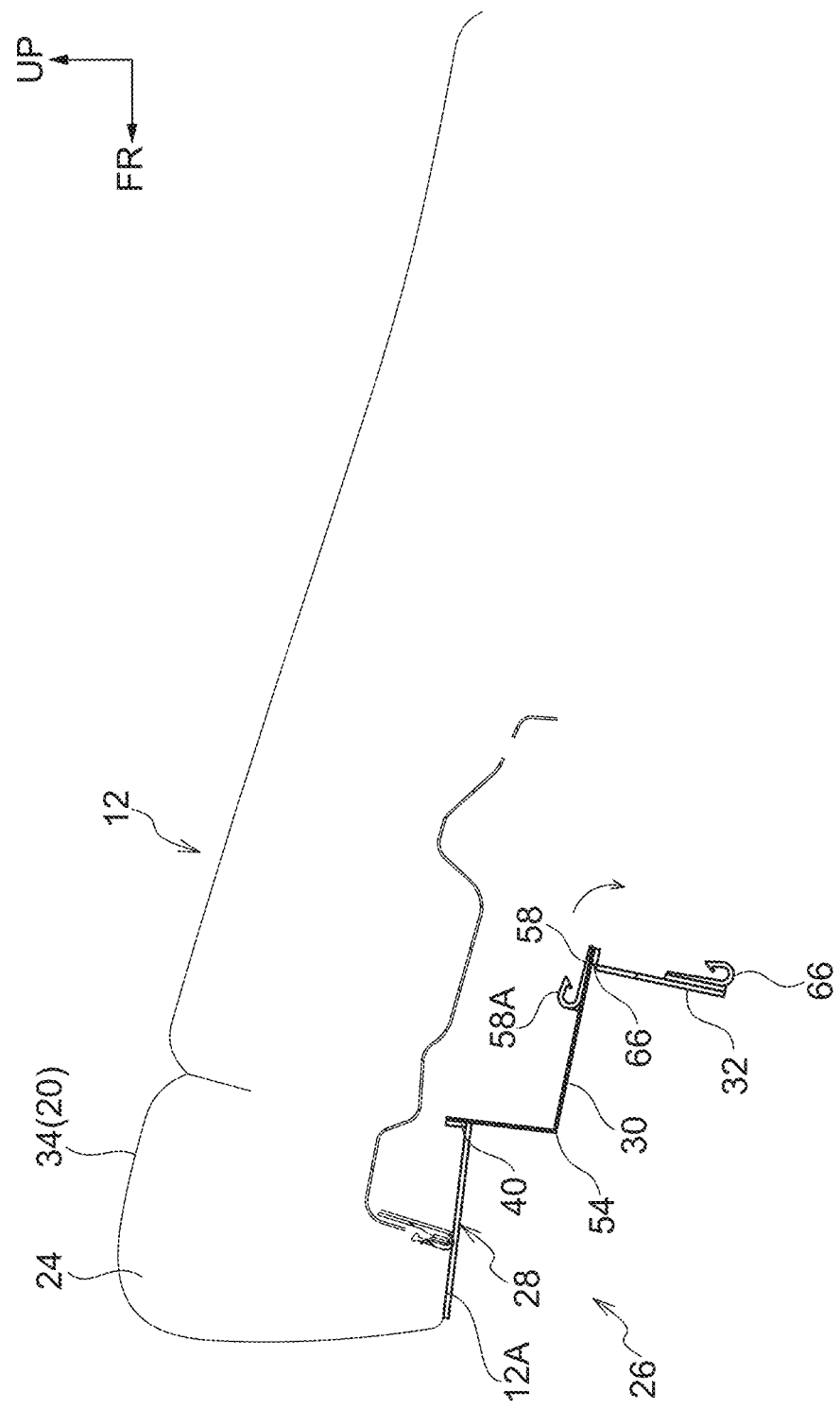
FIG. 5 is a schematic cross-sectional view taken along line A-A of FIG. 2 illustrating a state in which the front skirt is attached to the seat cushion of the vehicle seat according to the present embodiment.

As illustrated in FIG. 4, the upper section 28 has a substantially trapezoidal shape with the seat width direction as a longitudinal direction in a front view. An upper end corner portions 28A of the upper section 28 are rounded, and the upper section 28 is sewn and joined to a front end portion 34 of the seat skin 20 so as to be disposed at a lower surface 12A side of the seat cushion 12 as illustrated in FIG. 5.

As illustrated in FIG. 4, a lower end portion 28B of the upper section 28 is provided with a sewing margin 36 in which both ends in the longitudinal direction thereof are disposed inner side than both ends in the longitudinal direction of the upper section 28. The middle section 30 has a substantially rectangular shape with the seat width direction as the longitudinal direction, and an upper end portion 30A of the middle section 30 is provided with a sewing margin 38 in which both ends in the longitudinal direction thereof are disposed at inner sides than both ends in the longitudinal direction of the middle section 30.

As illustrated in FIG. 3, the sewing margin 38 is sewn via a sewing portion (first joint portion) 40 in a state of overlapping with the sewing margin 36 provided at the lower end portion 28B of the upper section 28, whereby the middle section 30 is integrated with the upper section 28.

The middle section 30 and the upper section 28 are integrated by sewing, but the joining of the members is not limited to sewing. For example, the joining may be performed by adhesion, welding, or the like, and such joining are not limited to the joining of the middle section 30 and the upper section 28, and the same applies to the joining of other members.

As illustrated in FIG. 4, in an upper portion 42 of the middle section 30, cutout portions (inducing portions) 46 having a triangular shape in a front view and cut out toward the inner sides in the longitudinal direction of the middle section 30 are formed at both end portions in the longitudinal direction of the middle section 30.

Both ends in the longitudinal direction of the upper portion 42 are inclined inwardly in the longitudinal direction and extend upwardly or downwardly away from the cutout portions 46. Both ends in the longitudinal direction of the upper portion 42 are sewn in a state of being folded back to a back surface 31 side of the middle section 30, and folded portions 48 are provided upper side and lower side with each one of the cutout portions 46 disposed in between.

In each cutout portions 46, as illustrated in FIG. 3, ends of the cutout portions 46, which are facing each other, are sewn by end sewing portions (end joint portion, inducing portion) 50 and 52. As a result, dimensions, in the seat vertical direction, at both end portions in the longitudinal direction of the upper portion 42 are shorter than a dimension, in the seat vertical direction, at a central portion in the longitudinal direction of the upper portion 42, and the back surface 31 side of the middle section 30 has a shape that narrows toward the front side.

A lower end portion 30B of the middle section 30 is provided with a sewing margin 56 in which both ends in the longitudinal direction thereof are disposed at inner sides than the both ends in the longitudinal direction of the middle section 30. At the sewing margin 56, a J fastener (hook member) 58 is co-sewn to the back surface 31 side of the middle section 30 via a sewing portion (third joint portion) 60 to be described later.

As illustrated in FIG. 6, the J fastener 58 can be engaged with a bracket (engaged member) 68 provided at the seat cushion frame 18 from above by the lower end portion 30B being rotated in an arrow direction as illustrated in FIG. 5. Here, as illustrated in FIG. 3, hook portions (inducing portions) 58A provided at a distal end of the J fastener 58 is located at a lower portion 44 of the middle section 30.

The lower section 32 has a substantially rectangular shape as a longitudinal direction in the seat width direction, and an upper end portion 32A of the lower section 32 is provided with a sewing margin 62. The sewing margin 62 is sewn via the sewing portion 60 in a state of overlapping with the sewing margin 56 provided at the lower end portion 30B of the middle section 30, whereby the lower section 32 is integrated with the middle section 30 and the upper section 28.

A J fastener (hook member) 66 is sewn to a lower end portion 32B of the lower section 32 via a sewing portion 67. The J fastener 66 is engaged with the bracket 68 (see FIG. 6) provided at the seat cushion frame 18 (see FIG. 6) from below.

With the above configuration, as illustrated in FIG. 6, in the front skirt 26, the upper section 28 is sewn and integrated with the seat skin 20 of the seat cushion 12, and the J fasteners 58 and 66 provided at the middle section 30 and the lower section 32, respectively, are engaged with the brackets 68 provided at the seat cushion frame 18, respectively, so that the lower side of the seat cushion 12 is shielded by the front skirt 26 so as not to be seen from the front as illustrated in FIG. 2.

As illustrated in FIG. 10, the middle section 30 is spread in the seat vertical direction so as not to be completely flat at the uppermost position Q of the seat cushion 12. That is, in the present embodiment, the middle section 30 is set to be bent (at less than 180 degrees) even at the uppermost position Q.

(Action and Effect of Vehicle Seat)

Next, actions and effects of the vehicle seat 10 according to the present embodiment will be described.

In the present embodiment, the seat cushion 12 illustrated in FIGS. 1 and 2 includes the tilt mechanism 22, and the height of the front end portion 24 of the seat cushion 12 can be changed. That is, the seat cushion 12 is tilted up as indicated by a two-dot chain line or tilted down as indicated by a solid line in FIG. 6 by the tilt mechanism 22.

As described above, when the seat cushion 12 is tilted up or down, the position of the front end portion 24 of the seat cushion 12 moves upwardly and downwardly while the position of the bracket 68 provided at the seat cushion frame 18 does not change. Therefore, the front skirt 26 needs to follow the tilting operation of the seat cushion 12.

In the present embodiment, the front skirt 26 is formed of a carpet material, and the cloth itself does not substantially stretch and contract. The length of the front skirt 26 in the seat vertical direction is adjusted by bending the front skirt 26.

As illustrated in FIG. 3, the front skirt 26 includes the upper section 28, the middle section 30, and the lower section 32. The upper section 28 is joined to the seat skin 20 covering the seat cushion pad 19 (see FIG. 1) of the seat cushion 12, and is disposed at the lower surface 12A side of the seat cushion 12.

The middle section 30 is disposed at the lower side of the upper section 28, and the middle section 30 is provided with the end sewing portions 50 and 52 as inducing portions that are triggers for bending of the middle section 30. The middle section 30 can follow the tilting operation of the seat cushion 12 by changing the bending angle at the bending starting point portion 54 that has been bent by the end sewing portions 50 and 52 such that a length in the seat vertical direction of the middle section 30 is extended and shortened.

That is, as illustrated in FIG. 7, in a state in which the seat cushion 12 is tilted down, the bending angle at the bending starting point portion 54 of the middle section 30 becomes small, and the middle section 30 is in a state of being bent and folded. On the other hand, as illustrated in FIG. 10, in a state in which the seat cushion 12 is tilted up, the bending angle of the bending starting point portion 54 becomes large, and the middle section 30 is in an extended state as compared with the state where the seat cushion 12 is tilted down. Note that the bending starting point portion 54 is disposed at the seat front side with respect to the sewing portion 40 in which the middle section 30 and the upper section 28 are sewn.

As described above and as illustrated in FIG. 7, when the seat cushion 12 is tilted down, the front skirt 26 is bent with the bending starting point portion 54 as a starting point of bending by the end sewing portions 50 and 52 (see FIG. 3), which are triggers for bending, and thus, it is possible to prevent the slack of the front skirt 26 caused by the tilting down of the seat cushion 12. Accordingly, it is possible to suppress deterioration of appearance due to slack of the front skirt 26.

The end sewing portions 50 and 52 serving as triggers of bending are formed in the middle section 30, and the middle section 30 is bent/extended with the bending starting point portion 54 as a starting point (see FIG. 3), whereby the front skirt 26 can follow the tilting operation of the seat cushion 12. That is, since no other component is used to bend/extend the middle section 30, deterioration of the appearance of the shielding member can be suppressed with a simple configuration.

The end sewing portions 50 and 52 will be specifically described. As illustrated in FIGS. 3 and 4, at both end portions in the longitudinal direction of the middle section 30 of the front skirt 26, the triangular cutout portions 46 are formed inwardly in the longitudinal direction.

By forming the cutout portions 46 in this manner, a reaction force with respect to an external force in the seat vertical direction becomes small at the cutout portions 46. Therefore, when an external force in the seat vertical direction acts on the middle section 30 when the seat cushion 12 (see FIG. 6) is tilted down, the middle section 30 is bent by the cutout portions 46 as triggers for being bent.

Moreover, the ends of the cutout portions 46 are sewn by the end sewing portions 50 and 52. Since the end sewing margins 51 and 53 of the end sewing portions 50 and 52 are provided at the back surface 31 side of the middle section 30, both end portions, in the seat width direction, of the middle section 30 narrow in advance toward the back surface 31 side of the middle section 30, and the middle section 30 has a shape bent in advance.

That is, a direction in which the middle section 30 is bent is determined by the end sewing portions 50 and 52, and when the seat cushion 12 (see FIG. 6) is tilted down, the end sewing portions 50 and 52 serve as inducing portions, and the middle section 30 is bent and extended in the seat vertical direction with a portion between the end sewing portion 50 and the end sewing portion 52 as the bending starting point portion 54. That is, the length of the front skirt 26 in the seat vertical direction can be changed by changing the bending angle of the middle section 30 of the front skirt 26.

Specifically, as illustrated in FIG. 10, in a case in which the seat cushion 12 is first tilted up and disposed at the uppermost position Q, the length of the front skirt 26 in the seat vertical direction is maximized. In this state, the J fastener 58 provided at the middle section 30 is disposed at the lower side of the sewing portion 40 in which the upper section 28 and the middle section 30 are sewn in the front skirt 26.

Then, the middle section 30 is set to bend toward the seat front side with the bending starting point portion 54 as a starting point. In consideration of dimensional tolerance of the front skirt 26, the seat cushion frame 18, and the bracket 68, the middle section 30 is set so as not to be extended completely flat at the uppermost position Q.

That is, at the uppermost position Q of the seat cushion 12, a tension is not applied to the front skirt 26, and the front skirt 26 is not pulled in a state in which a difference in height between the front end portion 24 and the bracket 68 is maximized.

Then, as illustrated in FIG. 9, when the seat cushion 12 is tilted down from the uppermost position Q of the seat cushion 12 illustrated in FIG. 10, the middle section 30 of the front skirt 26 is further bent with the bending starting point portion 54 as a starting point.

Since the bending starting point portion 54 is disposed at the seat front side of the sewing portion 40 of the upper section 28, when the seat cushion 12 is further tilted down from the state illustrated in FIG. 9, the upper portion 42 of the middle section 30 is folded with respect to the upper section 28 with the sewing portion 40 as a starting point as illustrated in FIG. 8. At this time, a separation distance L1 between the sewing portion 40 of the upper section 28 and the hook portion 58A of the J fastener 58 is shorter than a dimension L2 (see FIG. 4) of the lower portion 44, which is a dimension between the bending starting point portion 54 and the lower portion 44 of the middle section 30.

Here, as described above, in the seat cushion 12, the height of the front end portion 24 of the seat cushion 12 can be adjusted between the lowermost position P and the uppermost position Q by a four-node link mechanism (not illustrated) as illustrated in FIG. 6. Therefore, as the seat cushion 12 tilts down, the front end portion 24 moves toward the seat lower side, and the seat cushion 12 moves toward the seat rear side.

As illustrated in FIG. 8, since the position of the bending starting point portion 54 of the middle section 30 is disposed on the seat rear side of the hook portion 58A of the J fastener 58, when an further external force in the seat vertical direction acts on the front skirt 26 by tilting down of the seat cushion 12, the middle section 30 is folded against the upper section 28, as described above, and at the lower portion 44 side of the middle section 30, the lower portion 44 is bent at a bent portion 59 by the hook portion 58A of the J fastener 58, and an extra length of the lower portion 44 is guided toward the seat rear side.

When the seat cushion 12 is further tilted down from this state and the seat cushion 12 reaches the lowermost position P as illustrated in FIG. 7, a separation distance L3 between the sewing portion 40 of the upper section 28 and the hook portion 58A of the J fastener 58 is further shorter than the dimension L2 (see FIG. 4) of the middle section 30. Therefore, the middle section 30 is folded with respect to the upper section 28, and an angle of the bent portion 59 in the extra length of the lower portion 44 side of the middle section 30 is further reduced via the hook portion 58A of the J fastener 58.

As described above, in the present embodiment, the front skirt 26 can follow the tilting operation of the seat cushion 12 by changing the bending angle at the bending starting point portion 54 and the bent portion 59 in the middle section 30 of the front skirt 26. As illustrated in FIG. 9, the bending starting point portion 54 of the front skirt 26 is disposed at the seat front side with respect to the sewing portion 40, but the invention is not limited thereto, and the bending starting point portion may be disposed at the seat rear side. In the present embodiment, as illustrated in FIG. 7, in a state where the seat cushion 12 is disposed at the lowermost position P, the bending starting point portion 54 is disposed at the seat rear side of the hook portion 58A of the J fastener 58, but the invention is not limited thereto, and the bending starting point portion 54 may be disposed at the seat front side of the hook portion 58A of the J fastener 58.

In the present embodiment, the middle section 30 is formed by one piece, but the present disclosure is not limited thereto. For example, the middle section 30 may be formed of two pieces in the seat upward and downward direction, and the pieces may be integrated by being sewn to each other at the bending starting point portion 54. That is, the sewing portion may be formed as the bending starting point portion by being sewn in this manner.

The middle section 30 may be formed of one piece, and for example, a sewing portion, a bonding portion, and the like may be provided at a location to be bent, such as the bending starting point portion 54. The shielding member 26 may be formed of one piece or may be formed of a plurality of pieces.

Although one embodiment of the disclosure has been described above, the disclosure is not limited to the above, and it is a matter of course that various modifications other than the above can be made without departing from the scope of the disclosure.

What is claimed is:

1. A vehicle seat, comprising:
   a seat cushion on which an occupant can sit, the seat cushion including an upward and downward movement mechanism configured to adjust a position of the seat cushion in a range between an upper most position and a lower most position in a seat vertical direction; and
   a shielding member provided at a front end portion of the seat cushion, the shielding member having a seat shape and being configured to bend, and shielding a lower side of the seat cushion from a vehicle interior side,
   wherein the shielding member includes:
     an upper section joined to a seat skin, which covers a surface of the seat cushion and constitutes a design surface, and disposed at a lower surface side of the seat cushion,
     a middle section disposed at a lower side of the upper section, provided with an inducing portion serving as a trigger for bending of the shielding member, and being configured to follow a movement, in the seat vertical direction, of the seat cushion by changing a bending angle at a bending start point portion that is bent by the inducing portion, and a lower section disposed at a lower side of the middle section and disposed at the lower side of the seat cushion.

2. The vehicle seat according to claim 1, wherein the bending start point portion is disposed at a front side, in a seat front-rear direction, with respect to an upper end portion of the middle section.

3. The vehicle seat according to claim 1, wherein the bending start point portion is disposed at a rear side, in a seat front-rear direction, with respect to a lower end portion of the middle section, in a state in which the seat cushion is disposed at the lower most position.

4. The vehicle seat according to claim 1, wherein the inducing portion is a pair of cutout portions formed at both ends, in a seat width direction, of the middle section, and which respectively cut out inwardly in the seat width direction.

5. The vehicle seat according to claim 4, wherein the inducing portion includes a joint portion at which opposing ends, in the seat vertical direction, of each cutout portion are joined.

6. The vehicle seat according to claim 1, wherein:
the upper section and the middle section are integrated by a first joint portion, and
the first joint portion functions as the inducing portion.

7. The vehicle seat according to claim 1, wherein:
the middle section is configured by two pieces disposed in the seat vertical direction and joined to each other by a second joint portion, and
the second joint portion functions as the inducing portion.

8. The vehicle seat according to claim 1, wherein:
the lower section and the middle section are integrated by a third joint portion:
the vehicle seat further comprises a hook member joined to the third joint portion and engaged with an engaged member provided at a seat cushion frame, which constitutes a framework of the seat cushion, on the lower side of the seat cushion: and
a hook of the hook member is disposed at the middle section, and functions as the inducing portion in a case in which the seat cushion moves downwardly in the seat vertical direction.

* * * * *